(12) United States Patent
Shih et al.

(10) Patent No.: US 11,939,456 B2
(45) Date of Patent: Mar. 26, 2024

(54) COMPOSITION FOR PREPARING A FOAM, FOAM, AND SHOE EMPLOYING THE SAME

(71) Applicant: TSRC CORPORATION, Kaohsiung (TW)

(72) Inventors: Hsi-Hsin Shih, Kaohsiung (TW); Hsuan-Tsung Lin, Kaohsiung (TW); Ying-Pin Tu, Kaohsiung (TW); Han-Ming Tsai, Kaohsiung (TW)

(73) Assignee: TSRC CORPORATION, Kaohsiung (TW)

( * ) Notice: Subject to any disclaimer, the term of this patent is extended or adjusted under 35 U.S.C. 154(b) by 0 days.

(21) Appl. No.: 16/041,188

(22) Filed: Jul. 20, 2018

(65) Prior Publication Data

US 2019/0023884 A1    Jan. 24, 2019

Related U.S. Application Data

(60) Provisional application No. 62/535,680, filed on Jul. 21, 2017.

(51) Int. Cl.
| | |
|---|---|
| *C08L 23/08* | (2006.01) |
| *A43B 1/14* | (2006.01) |
| *A43B 13/02* | (2022.01) |
| *A43B 13/04* | (2006.01) |
| *C08J 9/10* | (2006.01) |
| *C08J 9/12* | (2006.01) |
| *C08L 53/02* | (2006.01) |

(52) U.S. Cl.
CPC ............ *C08L 23/0853* (2013.01); *A43B 1/14* (2013.01); *A43B 13/02* (2013.01); *A43B 13/04* (2013.01); *C08J 9/103* (2013.01); *C08J 9/122* (2013.01); *C08J 2203/04* (2013.01); *C08J 2203/06* (2013.01); *C08J 2323/08* (2013.01); *C08J 2409/06* (2013.01); *C08J 2423/06* (2013.01); *C08J 2423/08* (2013.01); *C08J 2423/20* (2013.01); *C08J 2425/12* (2013.01); *C08J 2445/00* (2013.01); *C08J 2453/02* (2013.01); *C08L 23/0823* (2013.01); *C08L 53/025* (2013.01); *C08L 2203/14* (2013.01); *C08L 2205/025* (2013.01); *C08L 2205/03* (2013.01); *C08L 2205/035* (2013.01); *C08L 2312/00* (2013.01)

(58) Field of Classification Search
CPC .................................................. C08L 23/0853
See application file for complete search history.

(56) References Cited

U.S. PATENT DOCUMENTS

| | | | | |
|---|---|---|---|---|
| 5,783,629 A * | 7/1998 | Srinivasan | .............. | C08L 23/16 428/424.8 |
| 5,869,591 A | 2/1999 | McKay et al. | | |
| 6,262,138 B1 * | 7/2001 | Miyama | ................. | C08J 9/0061 521/139 |
| 6,310,112 B1 * | 10/2001 | Vo | .............................. | C08J 9/14 521/134 |
| 6,316,090 B1 * | 11/2001 | Sugimoto | ............... | C08L 21/00 525/217 |
| 6,335,095 B1 * | 1/2002 | Sugimoto | ............... | C08L 21/00 525/934 |
| 6,521,705 B1 * | 2/2003 | Sugimoto | ............. | C08L 53/025 525/98 |
| 2004/0147680 A1 * | 7/2004 | Sugimoto | ............. | C08L 53/025 525/240 |
| 2006/0154998 A1 * | 7/2006 | Shiba | ...................... | B32B 27/32 521/142 |
| 2006/0205890 A1 | 9/2006 | Sasagawa et al. | | |
| 2007/0254971 A1 * | 11/2007 | De Vogel | ................ | B29C 70/66 521/59 |
| 2008/0287614 A1 * | 11/2008 | Dey | ........................ | C08L 23/10 525/92 R |

FOREIGN PATENT DOCUMENTS

| | | |
|---|---|---|
| CN | 1771284 A | 5/2006 |
| CN | 102257047 A | 11/2011 |
| EP | 0719806 A2 | 7/1996 |
| EP | 1 795 552 A1 | 6/2007 |

(Continued)

OTHER PUBLICATIONS

Taiwanese Office Action for Appl. No. 107124953 dated Sep. 18, 2019.

(Continued)

*Primary Examiner* — Irina Krylova
(74) *Attorney, Agent, or Firm* — Birch, Stewart, Kolasch & Birch, LLP

(57) ABSTRACT

A composition for preparing a foam, a foam, and a shoe employing the foam are provided. The composition for preparing a foam includes 3-30 parts by weight of a first polymer and at least one of a second polymer and a third polymer. The first polymer is cyclic olefin polymer (COP), cyclic olefin copolymer (COC), metallocene based cyclic olefin copolymer (mCOC), fully hydrogenated conjugated diene-vinyl aromatic copolymer, or a combination thereof. The total weight of the second polymer and the third polymer is 70-97 parts by weight. The second polymer is polyolefin, olefin copolymer, or a combination thereof. The third polymer is conjugated diene-vinyl aromatic copolymer, partially hydrogenated conjugated diene-vinyl aromatic copolymer, or a combination thereof. The total weight of the first polymer and at least one of the second polymer and the third polymer is 100 parts by weight.

4 Claims, 1 Drawing Sheet

(56) References Cited

FOREIGN PATENT DOCUMENTS

| | | |
|---|---|---|
| EP | 1795552 A1 | 6/2007 |
| EP | 3354681 A1 | 8/2018 |
| JP | 59-152396 A | 8/1984 |
| JP | 61-151197 A | 7/1986 |
| JP | 63-41484 A | 2/1988 |
| JP | 1-152109 A | 6/1989 |
| JP | 1-304453 A | 12/1989 |
| JP | 2-249 A | 1/1990 |
| JP | 2-291 A | 1/1990 |
| JP | 2-4705 A | 1/1990 |
| JP | 9-124818 A | 5/1997 |
| JP | 2001-197902 A | 7/2001 |
| JP | 2002-361768 A | 12/2002 |
| JP | 2004-331707 A | 11/2004 |
| JP | 2004-339339 A | 12/2004 |
| JP | 2010-111780 A | 5/2010 |
| JP | 2012-25798 A | 2/2012 |
| JP | 2012-25916 A | 2/2012 |
| JP | 2014-101432 A | 6/2014 |
| JP | 2014-141851 A | 8/2014 |
| JP | 2018-119145 A | 8/2018 |
| KR | 10-2008-0023306 A | 3/2008 |
| TW | 200712115 A | 4/2007 |
| TW | 200745250 | 12/2007 |
| WO | WO 2004/090028 A1 | 10/2004 |
| WO | WO 2006/123670 A1 | 11/2006 |
| WO | WO 2010/073589 A1 | 7/2010 |
| WO | WO 2016/076432 A1 | 5/2016 |

OTHER PUBLICATIONS

Japanese Office Action dated Jul. 23, 2019, for corresponding Japanese Application No. 2018-136465.
Korean Office Action for Appl. No. 10-2018-0084996 dated Feb. 18, 2020.
Extended European Search Report, dated Dec. 17, 2018, for European Application No. 18184830.0.
Office Action of Taiwanese Application No. 107124953, dated Mar. 6, 2019.
Japanese Office Action for Japanese Application No. 2018-136465, dated Jun. 16, 2020.
Chinese Office Action for Appl. No. 201810804877.4 dated Oct. 10, 2020.
Japanese Office Action for Japanese Application No. 2018-136465, dated Mar. 30, 2021, with English translation.

* cited by examiner

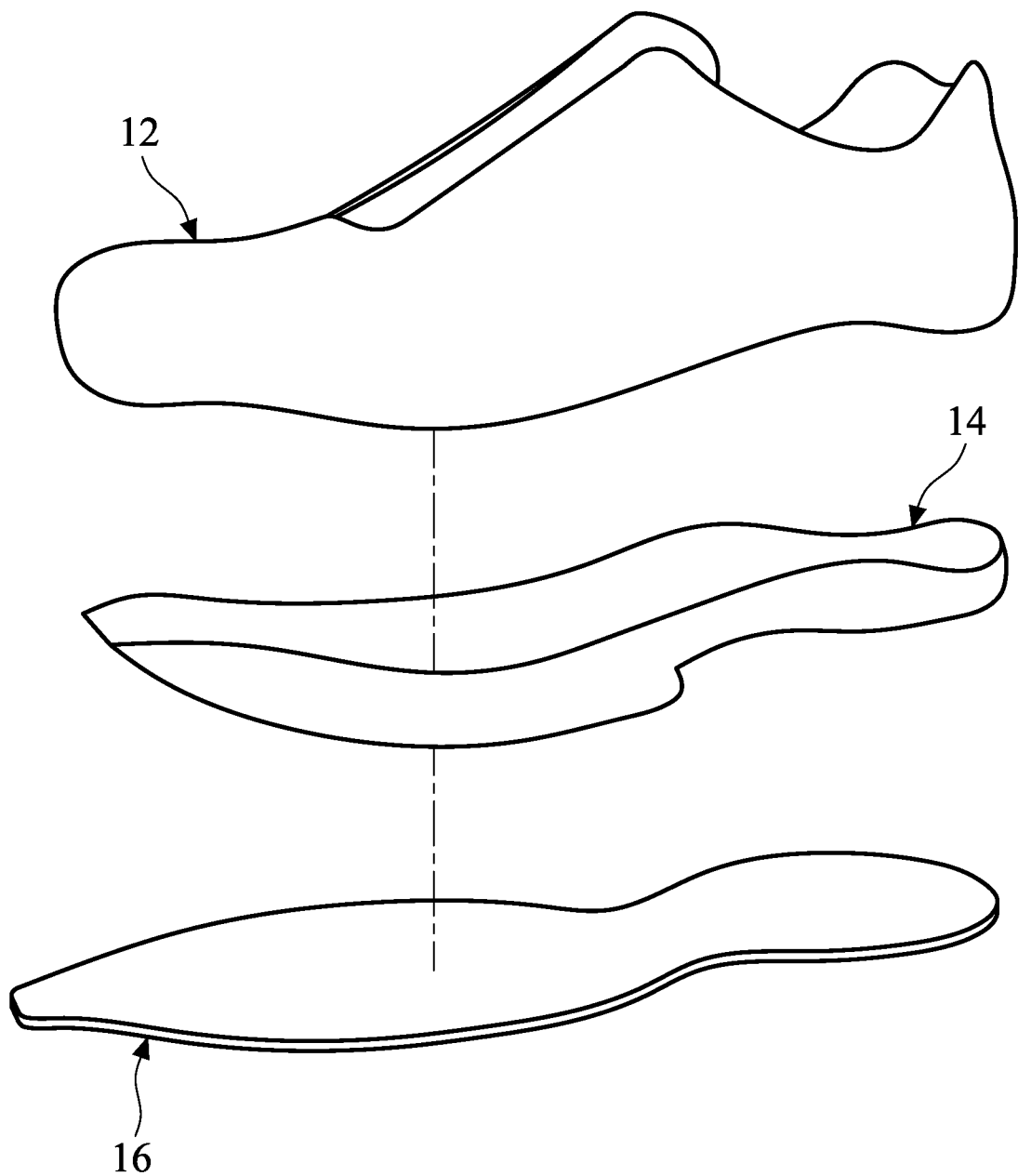

COMPOSITION FOR PREPARING A FOAM, FOAM, AND SHOE EMPLOYING THE SAME

CROSS REFERENCE TO RELATED APPLICATIONS

This application claims the benefit of U.S. Provisional Application No. 62/535,680, filed on Jul. 21, 2017, which is hereby incorporated herein by reference.

TECHNICAL FIELD

The disclosure relates to a composition for preparing a foam, a foam, and a shoe employing the same.

BACKGROUND

Rubber/plastic foams are used for various applications (such as electrical/mechanical parts, vehicle parts, building materials, packaging materials, or daily necessities) because of showing various properties (such as heat-shielding property, heat insulation, sound insulation, sound absorbency, vibration resistance, or light weight conveniences), depending on the raw material of the foam and the state of the bubbles that are formed.

However, the compression set and mechanical strength (such as split tear strength or tensile strength) of conventional foams are accordingly reduced along with the decrease in the density of the foams, thus restricting its use.

Therefore, it is necessary to develop a low-density and high-strength foam to solve the previously described problems.

SUMMARY

In accordance with one embodiment of the disclosure, a composition for preparing a foam is provided. The composition includes 3-30 parts by weight of a first polymer and at least one of a second polymer and a third polymer. The first polymer is cyclic olefin polymer (COP), cyclic olefin copolymer (COC), metallocene based cyclic olefin copolymer (mCOC), fully hydrogenated conjugated diene-vinyl aromatic copolymer, or a combination thereof. The total weight of the second polymer and the third polymer is 70-97 parts by weight. The second polymer is polyolefin, olefin copolymer, or a combination thereof. The third polymer is conjugated diene-vinyl aromatic copolymer, partially hydrogenated conjugated diene-vinyl aromatic copolymer, or a combination thereof. The total weight of the first polymer and at least one of the second polymer and the third polymer is 100 parts by weight.

In accordance with one embodiment of the disclosure, a low-density and high-strength foam is provided. The foam is prepared by the aforementioned composition for preparing a foam. In some embodiments, the ratio of the compression set to the specific gravity of the foam is less than 450. The ratio of the split tear strength to the specific gravity of the foam is greater than or equal to 13.8.

In accordance with one embodiment of the disclosure, a shoe including the above-mentioned foam is provided. The shoe includes an upper vamp, a midsole, and an outsole. At least one of the midsole and the outsole includes the present foam.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein:

FIG. 1 is a schematic diagram of a shoe in accordance with one embodiment of the disclosure.

DETAILED DESCRIPTION

The following description is the embodiments of carrying out the disclosure. This description is made for the purpose of illustrating the general principles of the disclosure and should not be taken in a limiting sense. The scope of the disclosure is determined by reference to the appended claims.

In accordance with one embodiment of the disclosure, a composition for preparing a foam, a foam, and a shoe employing the foam are provided. The present composition includes specific polymer ingredients and the contents thereof. When the composition is prepared into a foam by a foaming process (e.g. a physical or chemical foaming process), the obtained foam has a relatively low compression set and improved mechanical strength (such as split tear strength or tensile strength) under a low-density state (e.g. the specific gravity thereof is less than about 0.18). Therefore, the foam can be widely used in various applications (such as electrical/mechanical parts, vehicle parts, building materials, packaging materials, or daily necessities).

In accordance with some embodiments of the disclosure, the composition for preparing a foam may include about 3-30 parts by weight (e.g. 5-30 parts by weight, 5-20 parts by weight, 10-30 parts by weight or 20-30 parts by weight) of a first polymer and about 70-97 parts by weight (e.g. 70-95 parts by weight, 80-95 parts by weight, 70-90 parts by weight or 70-80 parts by weight) of a second polymer and/or a third polymer. The total weight of the first polymer, the second polymer and the third polymer is 100 parts by weight. For example, the composition may include 3-30 parts by weight of the first polymer and 70-97 parts by weight of the second polymer. The composition may include 3-30 parts by weight of the first polymer and 70-97 parts by weight of the third polymer. Optionally, the composition may include the first polymer, the second polymer and the third polymer. The weight of the first polymer is 3-30 parts by weight. The total weight of the second polymer and the third polymer is 70-97 parts by weight.

In accordance with some embodiments of the disclosure, the composition may consist of 3-30 parts by weight of the first polymer and 70-97 parts by weight of the second polymer. The composition may consist of 3-30 parts by weight of the first polymer and 70-97 parts by weight of the third polymer. Optionally, the composition may consist of the first polymer, the second polymer and the third polymer. The weight of the first polymer is 3-30 parts by weight. The total weight of the second polymer and the third polymer is 70-97 parts by weight.

In accordance with some embodiments of the disclosure, the composition may include the first polymer, the second polymer and the third polymer. The weight ratio of the third polymer to the second polymer is in a range from about 1:20 to about 1:5, from about 1:18 to about 1:5, from about 1:17 to about 1:5, from about 1:18 to about 1:7, from about 1:17 to about 1:7, or from about 1:20 to about 1:7.

In accordance with some embodiments of the disclosure, the first polymer may be cyclic olefin polymer (COP), cyclic olefin copolymer (COC), metallocene based cyclic olefin copolymer (mCOC), fully hydrogenated conjugated diene-vinyl aromatic copolymer, or a combination thereof.

In accordance with some embodiments of the disclosure, the weight average molecular weight of the first polymer may be in a range from about 10,000 to about 200,000, such as between about 40,000 and about 180,000, between about 40,000 and about 130,000, between about 50,000 and about 90,000, or between about 90,000 and about 120,000. The weight average molecular weight of the second polymer may be in a range from about 10,000 to about 200,000, such as between about 40,000 and about 180,000, or between about 80,000 and about 120,000. The weight average molecular weight of the third polymer may be in a range from about 10,000 to about 200,000, such as between about 50,000 and about 150,000, or between about 80,000 and about 120,000.

In accordance with some embodiments of the disclosure, the cyclic olefin polymer (COP) may be a polymer of substituted or unsubstituted norbornene-based monomer. For example, the norbornene-based monomer may be norbornene, ethylidene norbornene, dicyclopentadiene, methano tetrahydrofluorene, tetracyclododecene, or a combination thereof. In accordance with some embodiments of the disclosure, the substituted norbornene-based monomer means that at least one hydrogen (e.g., hydrogen on carbon) of the norbornene-based monomer can be replaced with an alkyl group or a reactive functional group (e.g., an alkenyl group).

In accordance with some embodiments of the disclosure, the cyclic olefin copolymer (COC) may be a copolymer of substituted or unsubstituted norbornene-based monomer and olefin-based monomer. The norbornene-based monomer may be norbornene, ethylidene norbornene, dicyclopentadiene, methano tetrahydrofluorene, tetracyclododecene, or a combination thereof. The olefin-based monomer may be ethylene, propylene, isobutylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, isoprene, tetrafluoroethylene, 1-decene, 1-dodecene, 1-tetradecene, 1-hexadecene, 1-octadecene, 1-eicosene, cyclobutene, cyclopentene, cyclohexene, cyclooctene, 1,3-butadiene, 1,3-pentadiene, 3,4-dimethyl-cyclopentene, 3-methyl-cyclohexene, 2-(2-methylbutyl)-1-cyclohexene, 1,4-hexadiene, 4-methyl-1,4-hexadiene, 5-methyl-1,4-hexadiene, 7-methyl-1,6-octadiene, 3,7-dimethyl-1,6-octadiene, 5,7-dimethyl-1,6-octadiene, 1,7-octadiene, 3,7,11-trimethyl-1,6,10-octatriene, 6-methyl-1,5-heptadiene, 1,6-heptadiene, 1,8-nonadiene, 1,9-decadiene, 1,10-undecadiene, or a combination thereof. In accordance with some embodiments of the disclosure, the ratio of the norbornene-based monomer to the olefin-based monomer may be in a range from about 30:70 to about 99:1, for example, from about 50:50 to about 97:3 or from about 70:30 to about 95:5.

In accordance with some embodiments of the disclosure, the first polymer may be, for example, ZEONEX (registered trademark, manufactured by Japan Zeon Co., Ltd.), ZEONOR (registered trademark, manufactured by Japan Zeon Co., Ltd.), ARTON (registered trademark, manufactured by JSR Co., Ltd.), APEL (registered trademark, manufactured by Mitsui Chemicals Co., Ltd.), or TOPAS (registered trademark, manufactured by POLYPLASTICS Co., Ltd., an addition polymer of norbornene-based monomer and ethylene).

In accordance with some embodiments of the disclosure, the fully hydrogenated conjugated diene-vinyl aromatic copolymer may be fully hydrogenated styrene-butadiene-styrene (SBS) block copolymer, fully hydrogenated styrene-butadiene-styrene-butadiene-styrene (SBSBS) block copolymer, fully hydrogenated styrene-(isoprene/butadiene)-styrene (S-(I/B)-S) block copolymer, fully hydrogenated styrene-(isoprene/butadiene)-styrene-(isoprene/butadiene)-styrene (S-(I/B)-S-(I/B)-S) block copolymer, fully hydrogenated styrene-isoprene-styrene (SIS) block copolymer, fully hydrogenated styrene-isoprene-styrene-isoprene-styrene (SISIS) block copolymer, or a combination thereof. In accordance with some embodiments of the disclosure, the fully hydrogenated conjugated diene-vinyl aromatic copolymer is prepared by hydrogenation of a conjugated diene-vinyl aromatic copolymer. After the hydrogenation of the conjugated diene-vinyl aromatic copolymer, the proportion of its double bonds (including non-aromatic double bonds and aromatic double bonds) converted into single bonds is greater than or equal to 90%, for example, greater than or equal to 95%, greater than or equal to 97%, or greater than or equal to 99%. In other words, the hydrogenation conversion of the fully hydrogenated conjugated diene-vinyl aromatic copolymer is greater than or equal to 90%; for example, greater than or equal to 95%, greater than or equal to 97%, or greater than or equal to 99%. For example, the first polymer may be ViViOn (registered trademark, manufactured by USI Co., Ltd.).

In accordance with some embodiments of the disclosure, the metallocene based cyclic olefin copolymer (mCOC) may be prepared by polymerizing the norbornene-based monomer and the olefin-based monomer with a metallocene compound. In addition, the metallocene based cyclic olefin copolymer (mCOC) may be prepared by polymerizing the norbornene-based monomer and the olefin-based monomer with a metallocene compound and an activated catalyst. As the metallocene compound, the examples thereof include the titanocene compounds described in JP1984-152396A (JP-S59-152396A), JP1986-151197A (JP-S61-151197A), JP1988-41484A (JP-S63-41484A), JP1990-249A (JP-H02-249A), JP1990-291A (JP-H02-291A), and JP1990-4705A (JP-H02-4705A), and the iron-arene complexes described in JP1989-304453A (JP-H01-304453A) and JP1989-152109A (JP-H01-152109A). The specific examples of the titanocene compound include bis(cyclopentadieny)-titanium-dichloride, bis(cyclopentadieny)-titanium-bis-phenyl, bis(cyclopentadieny)-titanium-bis(2,3,4,5,6-pentafluorophenyl), bis(cyclopentadieny)-titanium-bis(2,3,5,6-tetrafluorophenyl), bis(cyclopentadieny)-titanium-bis(2,4,6-trifluorophenyl), bis(cyclopentadieny)-titanium-bis(2,6-difluorophenyl), bis(cyclopentadieny)-titanium-bis(2,4-difluorophenyl), bis(methylcyclopentadieny)-titanium-bis(2,3,4,5,6-pentafluorophenyl), bis(methylcyclopentadieny)-titanium-bis(2,3,5,6-tetrafluorophenyl), bis(methylcyclopentadieny)-titanium-bis(2,6-difluorophenyl), bis(cyclopentadieny)-bis(2,6-difluoro-3-(pyr-1-yl)phenyl)titanium, bis(cyclopentadieny)-bis(2,4,6-trifluoro-3-(pyr-1-yl)phenyl)titanium, and bis(cyclopentadieny)-bis(2,4,6-trifluoro-3-(2-5-dimethylpyr-1-yl)phenyl)titanium, with bis(cyclopentadieny)-bis(2,6-difluoro-3-(pyr-1-yl)phenyl)titanium being preferable. The specific examples of the metallocene compound include bis(cyclopentadieny)bis[2,6-difluoro-3-(methylsulfonamide)phenyl]titanium, bis(cyclopentadieny)bis[2,6-difluoro-3-(N-butylbiaroyl-amino)phenyl]titanium, bis(cyclopentadieny)bis[2,6-difluoro-3-(N-butyl-(4-chlorobenzoyl) amino)phenyl]titanium, bis(cyclopentadieny)bis[2,6-difluoro-3-(N-benzyl-2,2-dimethylpentanoylamino)phenyl]

titanium, bis(cyclopentadieny)bis[2,6-difluoro-3-(N-(2-ethylhexyl)-4-tolyl-sulfonylamino)phenyl]titanium, bis(cyclopentadieny)bis[2,6-difluoro-3-(N-(3-oxaheptyl)benzoylamino)phenyl]titanium, bis(cyclopentadieny)bis[2,6-difluoro-3-(N-(3,6-dioxadecyl)benzoylamino)phenyl]titanium, bis(cyclopentadieny)bis[2,6-difluoro-3-(trifluoromethylsulfonylamino)phenyl]titanium, bis(cyclopentadieny)bis[2,6-difluoro-3-(trifluoroacetylamino)phenyl]titanium, bis(cyclopentadieny)bis[2,6-difluoro-3-(2-chlorobenzoyl)aminophenyl]titanium, bis(cyclopentadieny)bis[2,6-difluoro-3-(4-chlorobenzoylamino)phenyl]titanium, bis(cyclopentadieny)bis[2,6-difluoro-3-(N-(3,6-dioxadecyl)-2,2-dimethylpentanoylamino)phenyl]titanium, bis(cyclopentadieny)bis[2,6-difluoro-3-(N-(3,7-dimethyl-7-methoxyoctyl)benzoylamino)phenyl]titanium, and bis(cyclopentadieny)bis[2,6-difluoro-3-(N-cyclohexylbenzoylamino)phenyl]titanium.

In accordance with some embodiments of the disclosure, the polyolefin may be a polymer of olefin-based monomer (e.g., α-olefin-based monomer). For example, the olefin-based monomer may be ethylene, propylene, isobutylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, isoprene, tetrafluoroethylene, 1-decene, 1-dodecene, 1-tetradecene, 1-hexadecene, 1-octadecene, 1-eicosene, cyclobutene, cyclopentene, cyclohexene, cyclooctene, 1,3-butadiene, 1,3-pentadiene, 3,4-dimethylcyclopentene, 3-methyl-cyclohexene, 2-(2-methylbutyl)-1-cyclohexene, 1,4-hexadiene, 4-methyl-1,4-hexadiene, 5-methyl-1,4-hexadiene, 7-methyl-1,6-octadiene, 3,7-dimethyl-1,6-octadiene, 5,7-dimethyl-1,6-octadiene, 1,7-octadiene, 3,7,11-trimethyl-1,6,10-octatriene, 6-methyl-1,5-heptadiene, 1,6-heptadiene, 1,8-nonadiene, 1,9-decadiene, or 1,10-undecadiene.

In accordance with some embodiments of the disclosure, the olefin copolymer may be a copolymer containing olefin-based monomers (e.g., α-olefin-based monomers). For example, the olefin copolymer may be prepared by copolymerizing at least two of the following monomers: ethylene, propylene, isobutylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, isoprene, tetrafluoroethylene, 1-decene, 1-dodecene, 1-tetradecene, 1-hexadecene, 1-octadecene, 1-eicosene, cyclobutene, cyclopentene, cyclohexene, cyclooctene, 1,3-butadiene, 1,3-pentadiene, 3,4-dimethylcyclopentene, 3-methyl-cyclohexene, 2-(2-methylbutyl)-1-cyclohexene, 1,4-hexadiene, 4-methyl-1,4-hexadiene, 5-methyl-1,4-hexadiene, 7-methyl-1,6-octadiene, 3,7-dimethyl-1,6-octadiene, 5,7-dimethyl-1,6-octadiene, 1,7-octadiene, 3,7,11-trimethyl-1,6,10-octatriene, 6-methyl-1,5-heptadiene, 1,6-heptadiene, 1,8-nonadiene, 1,9-decadiene, 1,10-undecadiene, acrylate, vinyl acetate, or butyl acrylate.

In accordance with some embodiments of the disclosure, the second polymer may be poly(ethylene) (PE), high-density polyethylene (HDPE), linear low-density polyethylene (LLDPE), low-density polyethylene (LDPE), polypropylene, poly(propylene-α-olefin), ethylene-propylene copolymer (EPC), poly(ethylene-α-olefin), poly(ethylene-octene), poly(ethylene-hexene), poly(ethylene-butylene), poly(ethylene-heptene), polybutylene, polypentene, (ethylene-vinyl acetate) copolymer (EVA), ethylene-ethyl acrylate copolymer (EEA), (ethylene-butyl acrylate) copolymer (EBA), α-olefin polymer, α-olefin copolymer, or a combination thereof.

In accordance with some embodiments of the disclosure, the high-density polyethylene (HDPE) typically has a density of about 0.94 to about 0.97 g/cc. The low-density polyethylene (LDPE) typically has a density of about 0.91 to about 0.94 g/cc. In addition, the linear low-density polyethylene (LLDPE) is characterized by having a relatively small amount of long chain branches, if any, relative to the low-density polyethylene (LDPE).

In accordance with some embodiments of the disclosure, the second polymer may be, for example, AFFINITY (registered trademark, available from Dow Chemical Company), ENGAGE (registered trademark, available from Dow Chemical Company, an ethylene-1-octene copolymer), INFUSE (registered trademark, available from Dow Chemical Company), ATTANE (registered trademark, available from Dow Chemical Company), DOWLEX (registered trademark, available from Dow Chemical Company), ELITE (registered trademark, available from Dow Chemical Company), EXCEED (registered trademark, available from Exxon Chemical Company), EXACT (registered trademark, available from Exxon Chemical Company), or TAFMER (registered trademark, available from Mitsui Chemical Company).

In accordance with some embodiments of the disclosure, the conjugated diene-vinyl aromatic copolymer may be prepared by copolymerizing a conjugated diene monomer and a vinyl aromatic monomer. The conjugated diene monomer includes 1,3-butadiene, 2,3-dimethyl-1,3-butadiene, 3-butyl-1,3-octadiene, isoprene, 1-methylbutadiene, 2-phenyl-1,3-butadiene, 2-methyl-1,3-pentadiene 1,3-hexadiene, 4,5-diethyl-1,3-octadiene, or a combination thereof. The vinyl aromatic monomer includes styrene, methylstyrene and its isomers, ethylstyrene and its isomers, cyclohexylstyrene, vinyl biphenyl, 1-vinyl-5-hexyl naphthalene, vinyl naphthalene, vinyl anthracene, 4-tert-butylstyrene, divinyl benzene, 1,1-diphenyl ethylene, N,N-dimethyl-p-aminoethylstyrene, N,N-diethyl-p-aminoethylstyrene, or a combination thereof. For example, the conjugated diene-vinyl aromatic copolymer may be styrene-butadiene-styrene (SBS) block copolymer, styrene-isoprene-styrene (SIS) block copolymer, styrene-(isoprene/butadiene)-styrene (S-(I/B)-S) block copolymer, or a combination thereof. In addition, in accordance with some embodiments of the disclosure, the partially hydrogenated conjugated diene-vinyl aromatic copolymer may be, for example, partially hydrogenated styrene-butadiene-styrene (SBS) block copolymer (i.e. styrene-ethylene-butylene-styrene (SEBS) block copolymer), partially hydrogenated styrene-isoprene-styrene (SIS) block copolymer (i.e. styrene-ethylene-propylene-styrene (SEPS) block copolymer), partially hydrogenated styrene-(isoprene/butadiene)-styrene (S-(I/B)-S) block copolymer (i.e. styrene-[ethylene-(ethylene-propylene)]-styrene (SEEPS) block copolymer), or a combination thereof. In accordance with some embodiments of the disclosure, the partially hydrogenated conjugated diene-vinyl aromatic copolymer is prepared by selective hydrogenation of a conjugated diene-vinyl aromatic copolymer. After the selective hydrogenation of the conjugated diene-vinyl aromatic copolymer, the proportion of its non-aromatic double bonds converted into single bonds is greater than or equal to 70%, for example, greater than or equal to 80%, greater than or equal to 90%, greater than or equal to 95%, or greater than or equal to 98%. In other words, the hydrogenation conversion of the non-aromatic double bonds of the partially hydrogenated conjugated diene-vinyl aromatic copolymer is greater than or equal to 70%, for example, greater than or equal to 80%, or greater than or equal to 90%, or greater than or equal to 95%, or greater than or equal to 98%.

In accordance with some embodiments of the disclosure, the present composition may be prepared into a foam using a foaming process (e.g. a physical or chemical foaming process).

In accordance with some embodiments of the disclosure, the ratio of the compression set to the specific gravity of the foam may be less than 450, for example, between 449 and 180, between 445 and 200, between 445 and 250, between 350 and 180, between 350 and 200, or between 350 and 250. Furthermore, in accordance with some embodiments of the disclosure, the ratio of the split tear strength to the specific gravity of the foam is greater than or equal to 13.8, for example, between 13.8 and 20, or between 13.8 and 18.

In accordance with some embodiments of the disclosure, when the foam is formed by performing a chemical foaming process, the present composition for preparing a foam further includes 0.1-10 parts by weight of a cross-linking agent and 0.1-25 parts by weight of a blowing agent.

In accordance with some embodiments of the disclosure, the cross-linking agent is a peroxide-type cross-linking agent or a sulfur-type cross-linking agent. For example, the peroxide-type cross-linking agent includes such as dicumyl peroxide (DCP), perbutyl peroxide (PBP), dimethyl-di-tert-butylperoxy hexane, tert-butylethylhexyl carbonate monoperoxide, di-tert-butyl peroxide, 2,5-dimethyl-2,5-di(tert-butylperoxy)hexane, 2,5-dimethyl-2,5-di(tert-butylperoxy)-3-hexyne, di(tert-butylperoxyisopropyl)benzene, 1,1-di-tert-butyl-peroxy-3,3,5-trimethyl cyclohexane, butyl 4,4-bis(tert-butylperoxy)pentanoate, benzoyl peroxide, p-chlorobenzoyl peroxide, 2,4-dichlorobenzoyl peroxide, tert-butyl peroxybenzoate, tert-butylperoxy isopropyl carbonate, diacetyl peroxide, lauryl peroxide, tert-butyl cumyl peroxide, or a combination thereof, but the disclosure is not limited thereto.

In accordance with some embodiments of the disclosure, the blowing agent may be an organic thermal-decomposition-type blowing agent, for example, N,N'-dinitrosopentamethylenetetramine, azodicarbonamide, p,p'-oxybis(benzenesulfonyl hydrazide), p-toluenesulfonylhydrazide, benzenesulfonyl hydrazide, 3,3'-disulfonylhydrazide diphenylsulfone, p-toluenesulfonyl semicarbazide, trihydrazinotriazine, or a combination thereof, but the disclosure is not limited thereto. In addition, the blowing agent may be an inorganic thermal-decomposition-type blowing agent, for example, sodium bicarbonate, potassium bicarbonate, ammonium bicarbonate, sodium carbonate, ammonium carbonate, or a combination thereof, but the disclosure is not limited thereto.

In accordance with some embodiments of the disclosure, the present composition may further include heat stabilizer, light stabilizer, softener, plasticizer (such as citric acid or citric acid ester), dye, pigment, antioxidant, UV absorber, filler (such as calcium carbonate, mica or wood fiber), antistatic agent, impact modifier, or a combination thereof.

In accordance with some embodiments of the disclosure, when the foam is formed by a physical foaming process, a supercritical fluid may be used for foaming. The supercritical fluid may be carbon dioxide, water, methane, ethane, butane, propane, pentane, hexane, ethylene, propylene, methanol, ethanol, acetone, nitrogen, or a combination thereof.

In accordance with some embodiments of the disclosure, referring to FIG. 1, a shoe 10 is also provided. The shoe 10 includes an upper vamp 12, a midsole 14, and an outsole 16. Specifically, at least one of the midsole 14 and the outsole 16 includes the disclosed foam.

In order to make the above-mentioned and other objects, features, and advantages of the present disclosure more apparent and easy to understand, several specific examples and comparative examples are described in detail as follows.

Table 1 lists the materials involved in the embodiments of the disclosure.

TABLE 1

| Product code | Category | Supplier | Ingredients |
|---|---|---|---|
| EVA 7470 | Second polymer | Taisox | Ethylene-vinyl acetate copolymer |
| AS (PN-117C) | Second polymer | CHIMEI | Styrene-acrylonitrile copolymer |
| Infuse 9100 | Second polymer | Dow | Ethylene-1-octene copolymer |
| Infuse 9530 | Second polymer | Dow | Ethylene-1-octene copolymer |
| DF 110 | Second polymer | Mitsui | Ethylene-1-octene copolymer |
| DF 840 | Second polymer | Mitsui | Ethylene-α-olefin copolymer |
| LDPE NA-112-27 | Second polymer | USI | LDPE |
| DP6014 | Third polymer | TSRC | SEBS |
| SBS 3206 | Third polymer | TSRC | SBS |
| TOPAS 8007 | First polymer | TOPAS | Norbornene-ethylene copolymer |
| TOPAS 6013 | First polymer | TOPAS | Norbornene-ethylene copolymer |
| ViViOn 1325 | First polymer | USI | Fully hydrogenated conjugated diene-vinyl aromatic copolymer |
| AC D600 | Blowing agent | DongJin | Azodicarbonamide |
| D600MT | Blowing agent | DongJin | Azodicarbonamide |
| DCP-40 | Cross-linking agent | Usha Chemicals | Dicumyl peroxide |
| BIPB | Cross-linking agent | Vulchem | di(tert-butylperoxyisopropyl)benzene |

Chemical Foaming Process

Example 1

50 parts by weight of EVA 7470, 25 parts by weight of Infuse 9100, 10 parts by weight of DF 110, 4.3 parts by weight of DP6014, 0.7 parts by weight of SBS 3206, 10 parts by weight of TOPAS 8007, 1.6 parts by weight of DCP-40, and 14.5 parts by weight of AC D600 were placed in a mixer. After heating to 120° C., the mixing process was continued until the resultant was completely fused. Next, the resultant was pelletized with a twin-screw extruder and the pellets were collected. Next, the pellets were placed in a foam injector and then injected to mold a test piece at a mold temperature of about 172° C. The shaping time was about 390 seconds. Next, the test piece was placed in an oven and then baked at 70-75° C. for 45-60 minutes. After the test piece was removed from the oven and left to stand at room temperature for one day, the test piece was subjected to a cold-hot compression molding process with a mold (size of 400 mm×305 mm×90 mm (length×width×height)), obtaining Foam (I). The surface of the test piece reached 138° C. when heated, and the surface of the test piece reached 20° C. when cooled.

Next, the specific gravity, compression set, and split tear strength of Foam (I) were measured. The results are shown in Table 2. The measurement method of the specific gravity was based on ASTM D792. The measurement method of the compression set was based on ASTM D573. The measurement method of the split tear strength was based on ASTM D3574-95.

Examples 2-8 and Comparative Example 1

Examples 2-8 and Comparative Example 1 were performed in the same manner as in Example 1 except that the ingredients and contents of the first polymer, the second polymer, the third polymer, the cross-linking agent and the blowing agent listed in Table 2 were substituted for those used in Example 1, obtaining Foam (II)-(IX). Next, the specific gravity, compression set, and split tear strength of Foam (II)-(IX) were measured. The results are shown in Table 2.

TABLE 2

| | first polymer/parts by weight | second polymer/parts by weight | third polymer/parts by weight | cross-linking agent/parts by weight, blowing agent/parts by weight | specific gravity | the ratio of compression set to specific gravity | the ratio of split tear strength to specific gravity |
|---|---|---|---|---|---|---|---|
| Ex. 1 | TOPAS 8007/10 | EVA 7470/50, Infuse 9100/25, DF 110/10 | DP6014/4.3, SBS 3206/0.7 | DCP-40/1.6, AC D600/14.5 | 0.128 | 442 | 13.83 |
| Ex. 2 | TOPAS 8007/20 | EVA 7470/44.4, Infuse 9100/22.2, DF 110/8.9 | DP6014/3.8, SBS 3206/0.7 | DCP-40/1.6, AC D600/14.5 | 0.131 | 334 | 14.43 |
| Ex. 3 | TOPAS 8007/30 | EVA 7470/38.9, Infuse 9100/19.4, DF 110/7.8 | DP6014/3.3, SBS 3206/0.6 | DCP-40/1.6, AC D600/14.5 | 0.127 | 353 | 16.61 |
| Ex. 4 | TOPAS 6013/10 | EVA 7470/50, Infuse 9100/25, DF 110/10 | DP6014/4.3, SBS 3206/0.8 | DCP-40/1.6, AC D600/14.5 | 0.135 | 366 | 14.44 |
| Ex. 5 | TOPAS 6013/20 | EVA 7470/44.4, Infuse 9100/22.2, DF 110/8.9 | DP6014/3.8, SBS 3206/0.7 | DCP-40/1.6, AC D600/14.5 | 0.121 | 344 | 14.55 |
| Ex. 6 | TOPAS 6013/30 | EVA 7470/38.9, Infuse 9100/19.4, DF 110/7.8 | DP6014/3.3, SBS 3206/0.6 | DCP-40/1.6, AC D600/14.5 | 0.131 | 273 | 15.27 |
| Ex. 7 | TOPAS 8007/20, TOPAS 6013/10 | EVA 7470/38.9, Infuse 9100/19.4, DF 110/7.8 | DP6014/3.3, SBS 3206/0.6 | DCP-40/1.6, AC D600/14.5 | 0.124 | 306 | 15.00 |
| Ex. 8 | TOPAS 8007/10, TOPAS 6013/20 | EVA 7470/38.9, Infuse 9100/19.4, DF 110/7.8 | DP6014/3.3, SBS 3206/0.6 | DCP-40/1.6, AC D600/14.5 | 0.121 | 310 | 16.36 |
| Com. Ex. 1 | — | EVA 7470/55.6, Infuse 9100/27.8, DF 110/11.1 | DP6014/4.7, SBS 3206/0.8 | DCP-40/1.6, AC D600/14.5 | 0.132 | 467 | 13.56 |

As shown in Table 2, in comparison with the composition without addition of the first polymer (Comparative Example 1), the foam prepared from the compositions with the added first polymer (Examples 1-8) via a chemical foaming process has the relatively low ratio of compression set to specific gravity. The ratio of split tear strength to specific gravity thereof can also be improved at the same time.

Example 9

90 parts by weight of EVA 7470, 10 parts by weight of ViViOn 1325, 0.8 parts by weight of BIPB, and 7.0 parts by weight of AC D600 were placed in a mixer. After heating to 120° C., the mixing process was continued until the resultant was completely fused. Next, the resultant was pelletized with a twin-screw extruder and the pellets were collected. Next, the pellets were placed in a foam injector and then injected to mold a test piece at a mold temperature of about 172° C. The shaping time was about 390 seconds. Next, the test piece was placed in an oven and then baked at 70-75° C. for 45-60 minutes. After the test piece was removed from the oven and left to stand at room temperature for one day, the test piece was subjected to cold-hot compression molding process with a mold (size of 400 mm×305 mm×90 mm (length×width×height)), obtaining Foam (X). The surface of the test piece reached 138° C. when heated, and the surface of the test piece reached 20° C. when cooled.

Next, the specific gravity, compression set, and split tear strength of Foam (X) were measured. The results are shown in Table 3.

Example 10

Example 10 was performed in the same manner as in Example 9 except that TOPAS 6013 was substituted for ViViOn 1325, obtaining Foam (XI). Next, the specific gravity, compression set, and split tear strength of Foam (XI) were measured. The results are shown in Table 3.

Comparative Example 2

100 parts by weight of EVA 7470, 0.8 parts by weight of BIPB, and 7.0 parts by weight of AC D600 were placed in a mixer. After heating to 120° C., the mixing process was continued until the resultant was completely fused. Next, the resultant was pelletized with a twin-screw extruder and the pellets were collected. Next, the pellets were placed in a foam injector and then injected to mold a test piece at a mold temperature of about 172° C. The shaping time was about 390 seconds. Next, the test piece was placed in an oven and then baked at 70-75° C. for 45-60 minutes. After the test piece was removed from the oven and left to stand at room temperature for one day, the test piece was subjected to cold-hot compression molding process with a mold (size of 400 mm×305 mm×90 mm (length×width×height)), obtaining Foam (XII). The surface of the test piece reached 138° C. when heated, and the surface of the test piece reached 20° C. when cooled.

Next, the specific gravity, compression set, and split tear strength of Foam (XII) were measured. The results are shown in Table 3.

TABLE 3

| | first polymer/parts by weight | second polymer/parts by weight | cross-linking agent/parts by weight, blowing agent/parts by weight | specific gravity | the ratio of compression set to specific gravity | the ratio of split tear strength to specific gravity |
|---|---|---|---|---|---|---|
| Ex. 9 | ViViOn 1325/10 | EVA 7470/90 | BIPB/0.8, AC D600/7.0 | 0.171 | 234 | 14 |
| Ex. 10 | TOPAS 6013/10 | EVA 7470/90 | BIPB/0.8, AC D600/7.0 | 0.174 | 207 | 16 |
| Com. Ex. 2 | — | EVA 7470/100 | BIPB/0.8, AC D600/7.0 | 0.176 | 256 | 11 |

As shown in Table 3, in comparison with the composition consisting essentially of the second polymer (Comparative Example 2), the foam prepared from the compositions with the added first polymer and second polymer (Examples 9-10) via a chemical foaming process has the relatively low ratio of compression set to specific gravity. The ratio of split tear strength to specific gravity thereof can also be improved at the same time.

Example 11

55 parts by weight of EVA 7470, 25 parts by weight of Infuse 9100, 15 parts by weight of DF 840, 5.0 parts by weight of TOPAS 8007, 1.7 parts by weight of DCP-40, and 8.2 parts by weight of D600MT were placed in a mixer. After heating to 120° C., the mixing process was continued until the resultant was completely fused. Next, the resultant was pelletized with a twin-screw extruder and the pellets were collected. Next, the pellets were placed in a foam injector and then injected to mold a test piece at a mold temperature of about 172° C. The shaping time was about 390 seconds. Next, the test piece was placed in an oven and then baked at 70-75° C. for 45-60 minutes. After the test piece was removed from the oven and left to stand at room temperature for one day, the test piece was subjected to cold-hot compression molding process with a mold (size of 400 mm×305 mm×90 mm (length×width×height)), obtaining Foam (XIII). The surface of the test piece reached 138° C. when heated, and the surface of the test piece reached 20° C. when cooled.

Next, the specific gravity, compression set, and split tear strength of Foam (XIII) were measured. The results are shown in Table 4.

Example 12

Example 12 was performed in the same manner as in Example 11 except that the ingredients and contents of the first polymer, the second polymer, the third polymer, the cross-linking agent and the blowing agent listed in Table 4 were substituted for those used in Example 11, obtaining Foam (XIV). Next, the specific gravity, compression set, and split tear strength of Foam (XIV) were measured. The results are shown in Table 4.

TABLE 4

| | first polymer/parts by weight | second polymer/parts by weight | third polymer/parts by weight | cross-linking agent/parts by weight, blowing agent/parts by weight | specific gravity | the ratio of compression set to specific gravity | the ratio of split tear strength to specific gravity |
|---|---|---|---|---|---|---|---|
| Ex. 11 | TOPAS 8007/5 | EVA 7470/55, Infuse 9100/25, DF 840/15 | — | DCP-40/1.7, D600MT/8.2 | 0.2148 | 193 | 15 |
| Ex. 12 | TOPAS 6013/5 | EVA 7470/45, Infuse 9530/20, AS(PN-117C)/5, LDPE NA-112-27/15 | DP6014/8.5, SBS 3206/1.5 | BIPB/0.65, D600MT/8.1 | 0.1273 | 429 | 17 |

As shown in Table 4, when the content of the first polymer of the compositions (described in Examples 11 and 12) is reduced, the resulting foam still has a ratio of compression set to specific gravity less than 450, and the ratio of split tear strength to specific gravity thereof is greater than or equal to 15.

Physical Foaming Process

Example 13

90 parts by weight of EVA 7470 and 10 parts by weight of ViViOn 1325 were placed in a mixer. After heating to 120° C., the mixing process was continued until the resultant was completely fused. Next, the resultant was pelletized with a twin-screw extruder and the pellets were collected. Next, the pellets were placed in a tank of a supercritical fluid foaming system and the system temperature was adjusted to above 60° C. (not reaching a molten state). Carbon dioxide was then injected into the supercritical fluid foaming system and mixed with the pellets. Then, the system pressure was adjusted to over 1,000 psi to form a single-phase solution of the pellets with the supercritical fluid of carbon dioxide and maintain it for more than 10 minutes. Next, the system pressure was adjusted to 15 psi to obtain Foam (XV) with a specific gravity of 0.126.

Example 14

Example 14 performed in the same manner as in Example 13, except that TOPAS 6013 was substituted for ViViOn 1325, obtaining Foam (XVI) with a specific gravity of 0.133

Comparative Example 3

100 parts by weight of EVA 7470 was placed in a supercritical fluid foaming system and the system temperature was adjusted to above 60° C., the pellets not reaching a molten state. Carbon dioxide was then injected into the supercritical fluid foaming system and mixed with the pellets. Then, the system pressure was adjusted to over 1,000 psi to form a single-phase solution of the pellets with the supercritical fluid of carbon dioxide and maintain it for more than 10 minutes. Next, the system pressure was adjusted to 15 psi to obtain Foam (XVII). Herein, it was observed that Foam (XVII) suffered a severe shrinkage phenomenon, resulting in that Foam (XVII) exhibits an extremely poor swelling capability. Foam (XVII), serving as a midsole or outsole of a shoe, does not produce feedback provided by the elasticity when applying a force thereto.

While the disclosure has been described by way of example and in terms of preferred embodiment, it is to be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A composition for preparing a foam, comprising:
10-30 parts by weight of a copolymer of a norbornene-based monomer and an olefin-based monomer, wherein the norbornene-based monomer is norbornene, ethylidene norbornene, dicyclopentadiene, methano tetrahydrofluorene, tetracyclododecene, or a combination thereof;
about 39 to 50 parts by weight of an ethylene-vinyl acetate copolymer;
27-35 parts by weight of an ethylene-1-octene copolymer;
3-5 parts by weight of a conjugated diene-vinyl aromatic copolymer which is a styrene-butadiene-styrene (SBS) block copolymer, a styrene-isoprene-styrene (SIS) block copolymer, a styrene-(isoprene/butadiene)-styrene (S-(I/B)-S) block copolymer, a styrene-ethylene-butylene-styrene (SEBS) block copolymer, or a combination thereof, or a partially hydrogenated conjugated diene-vinyl aromatic copolymer which is a partially hydrogenated styrene-butadiene-styrene (SBS) block copolymer, a partially hydrogenated styrene-isoprene-styrene (SIS) block copolymer, a partially hydrogenated styrene-(isoprene/butadiene)-styrene (S-(I/B)-S) block copolymer, a partially hydrogenated styrene-ethylene-butylene-styrene (SEBS) block copolymer, or a combination thereof, wherein the partially hydrogenated conjugated diene-vinyl aromatic copolymer has a proportion of its non-aromatic double bonds converted into single bonds which is greater than or equal to 70%;

0.1-10 parts by weight of a cross-linking agent; and 0.1-25 parts by weight of a blowing agent;

wherein a ratio of a compression set to a specific gravity of a foam produced from the composition is between 449 and 180; and wherein a ratio of a split tear strength to the specific gravity of the foam produced from the composition is between 13.8 and 18.

2. The composition for preparing a foam as claimed in claim 1, wherein the composition for preparing the foam consists of the copolymer of the norbornene-based monomer and the olefin-based monomer, the ethylene-vinyl acetate copolymer, the conjugated diene-vinyl aromatic copolymer or the partially hydrogenated conjugated diene-vinyl aromatic copolymer, the cross-linking agent, and the blowing agent.

3. A foam prepared from the composition for preparing a foam as claimed in claim 1.

4. A shoe, comprising:

an upper vamp;

a midsole; and an outsole, wherein at least one of the midsole and the outsole comprises the foam as claimed in claim 3.

* * * * *